United States Patent [19]

Damkroger

[11] Patent Number: 5,737,355
[45] Date of Patent: Apr. 7, 1998

[54] DIRECTLY INDUCED SWING FOR CLOSED LOOP CONTROL OF ELECTROSLAG REMELTING FURNACE

[75] Inventor: Brian Damkroger, Corrales, N. Mex.

[73] Assignee: Sandia Corporation, Albuquerque, N. Mex.

[21] Appl. No.: 510,960

[22] Filed: Sep. 21, 1995

[51] Int. Cl.⁶ ........................................... H05B 3/60
[52] U.S. Cl. .............................. 373/50; 373/105; 373/108
[58] Field of Search ........................... 373/42, 46, 47, 373/49, 50, 102, 104, 108, 105

[56] References Cited

U.S. PATENT DOCUMENTS

| | | |
|---|---|---|
| 4,131,754 | 12/1978 | Roberts .................................. 13/34 |
| 4,303,797 | 12/1981 | Roberts .................................. 13/13 |
| 5,331,661 | 7/1994 | Maguire et al. ...................... 373/105 |
| 5,568,506 | 10/1996 | Schlienger ............................ 373/50 |

*Primary Examiner*—Tu B. Hoang
*Attorney, Agent, or Firm*—George H. Libman

[57] ABSTRACT

An apparatus and method for controlling an electroslag remelting furnace, imposing a periodic fluctuation on electrode drive speed and thereby generating a predictable voltage swing signal. The fluctuation is preferably done by imposition of a sine, square, or sawtooth wave on the drive dc offset signal.

7 Claims, 8 Drawing Sheets

PRIOR ART

FIG. 1

Prior Art

Prior Art

DIRECTLY INDUCED SWING FOR CLOSED LOOP CONTROL OF ELECTROSLAG REMELTING FURNACE

GOVERNMENT RIGHTS

The Government has rights to this invention pursuant to Contract No. DE-AC04-76DP00789 awarded by the U.S. Department of Energy.

BACKGROUND OF THE INVENTION

1. Field of the Invention (Technical Field)

The present invention relates to control systems and methods for electroslag remelting (ESR) furnaces.

2. Background Art

At present, most ESR furnaces strive to control immersion depth using a combination of two electrical signals: rms voltage (V(rms)), and a property called voltage swing ($V_s$). The control systems and power supplies are set up to deliver a constant rms current, and a V(rms) set point is used to locate the electrode. Treating the slag as having constant resistivity and the current path through the path as having constant cross-sectional area, Ohm's law dictates that V(rms) increases proportionally with the electrode-to-pool gap.

|         |                                           |
|---------|-------------------------------------------|
|         | R = rl/A                                  |
| and     | V = IR                                    |
| so      | V = Irl/A                                 |
| where:  | R = resistance                            |
|         | r = resistivity (assumed constant)        |
|         | A = current path area (assumed constant)  |
|         | V = voltage                               |
|         | I = current (assumed constant)            |
|         | l = length (electrode to pool gap)        |

Because the current is kept constant, as the electrode moves relative to the slag, the system voltage changes. As the system drifts away from and is driven back to the V(rms) set point, the electrode movements give rise to oscillations in the V(rms) signal. The magnitude of these V(rms) oscillations are $V_s$.

Figure 2:
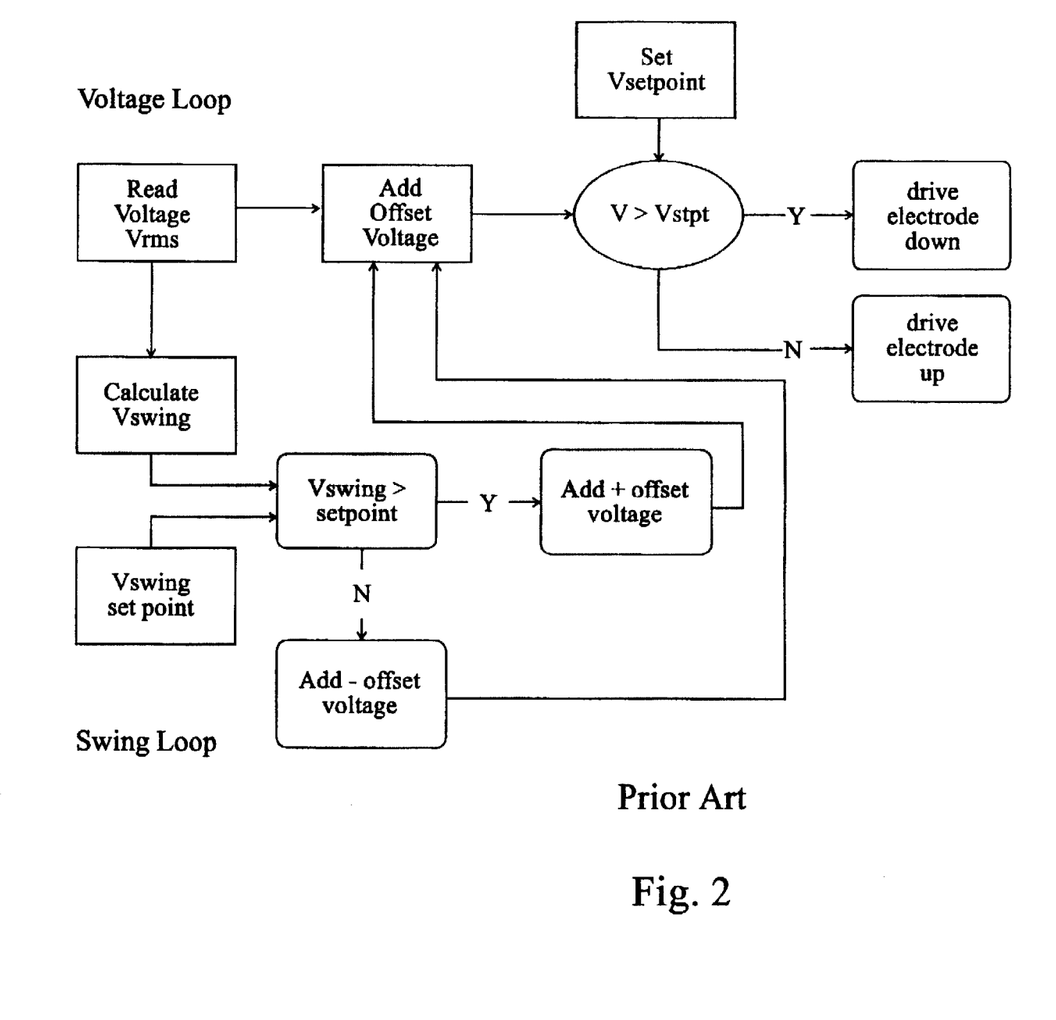
FIG. 2 is a flow diagram of the typical prior art control system employing the V(rms)+$V_s$ control strategy.

Existing control schemes (referred to here as V(rms)+$V_s$ systems) locate the electrode using a comparison of V(rms), $V_s$, and their set points. The logic of an existing system is shown schematically in FIG. 2. At any given time, the actual furnace voltage V(rms) is compared to a voltage set point. If V(rms)>V(set point), the electrode is driven downward; if V(rms)<V(set point), the drive is upward. In most cases, a proportional-integral-differential (PID) control is used to set the response. At any point in time, Ohm's law generally applies and the V(rms) signal is a good indicator of electrode position. Over time however, or from melt to melt, the absolute voltage level required to maintain a specified immersion depth changes. This is due to several factors, including: quantity of slag, slag chemistry, slag and ingot temperature, electrode size and composition, cooling water temperature, flow rate, and slag skin thickness.

Figure 3:
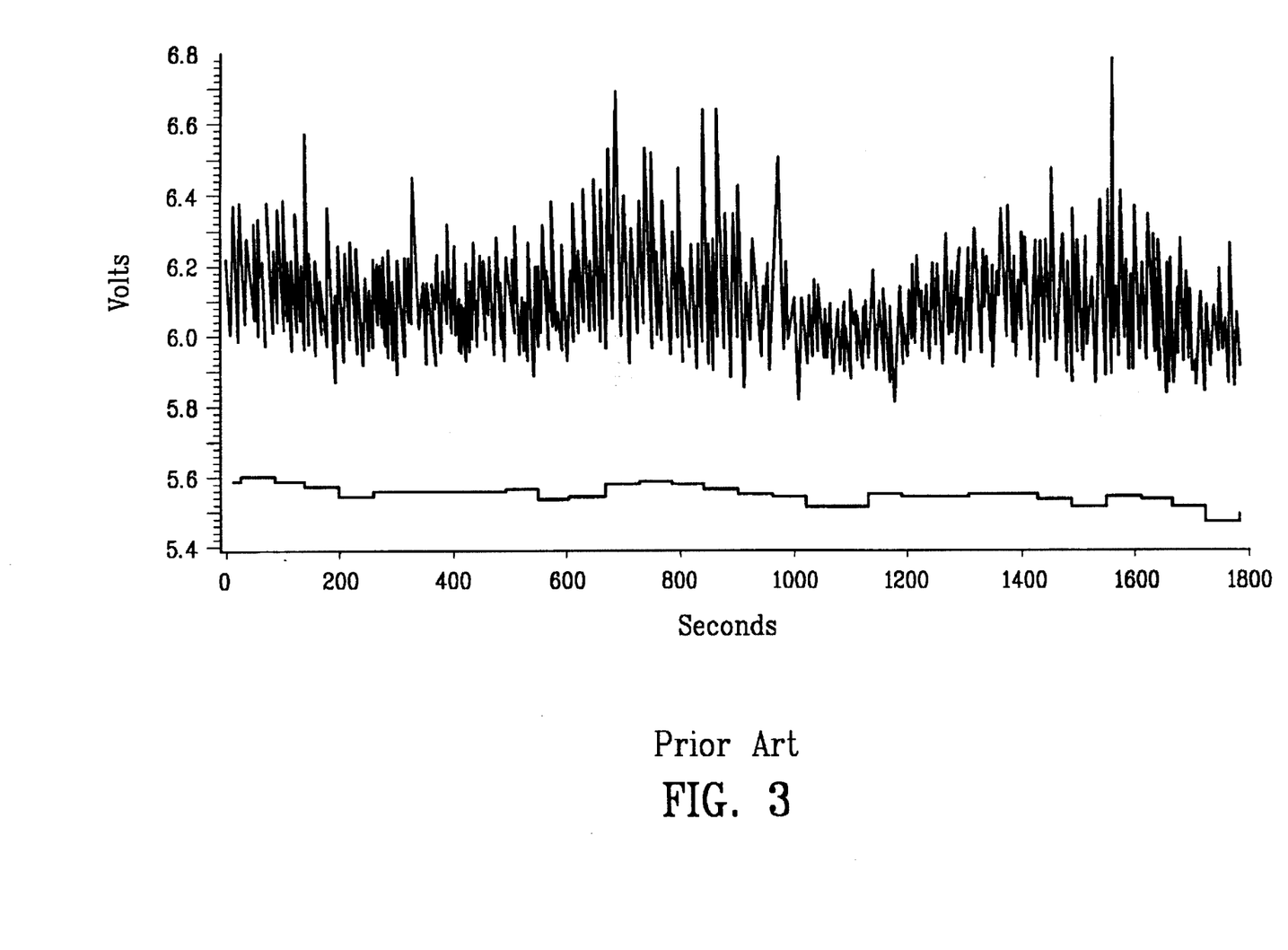
FIG. 3 is a typical graph of V(rms) versus time for an industrial ESR furnace controlled according to the method of FIG. 2.

Because of these long term system changes, the $V_s$ signal is used to modify the voltage control algorithms to maintain a shallow immersion depth. FIG. 3 shows V(rms) versus time for an industrial furnace. As this figure shows, the rms voltage fluctuates about a mean due to changes in the position of the electrode bottom with respect to the isopotential lines in the slag. The amplitude of these fluctuations is defined as $V_s$. The isopotential lines generally become compressed near the slag surface, so any relative motion between the electrode and slag near the surface results in a larger voltage swing than the same motion deeper in the slag. $V_s$ has proven to be a robust measure of immersion depth, but is too insensitive and too slow to be used to directly drive the electrode.

Figure 4:
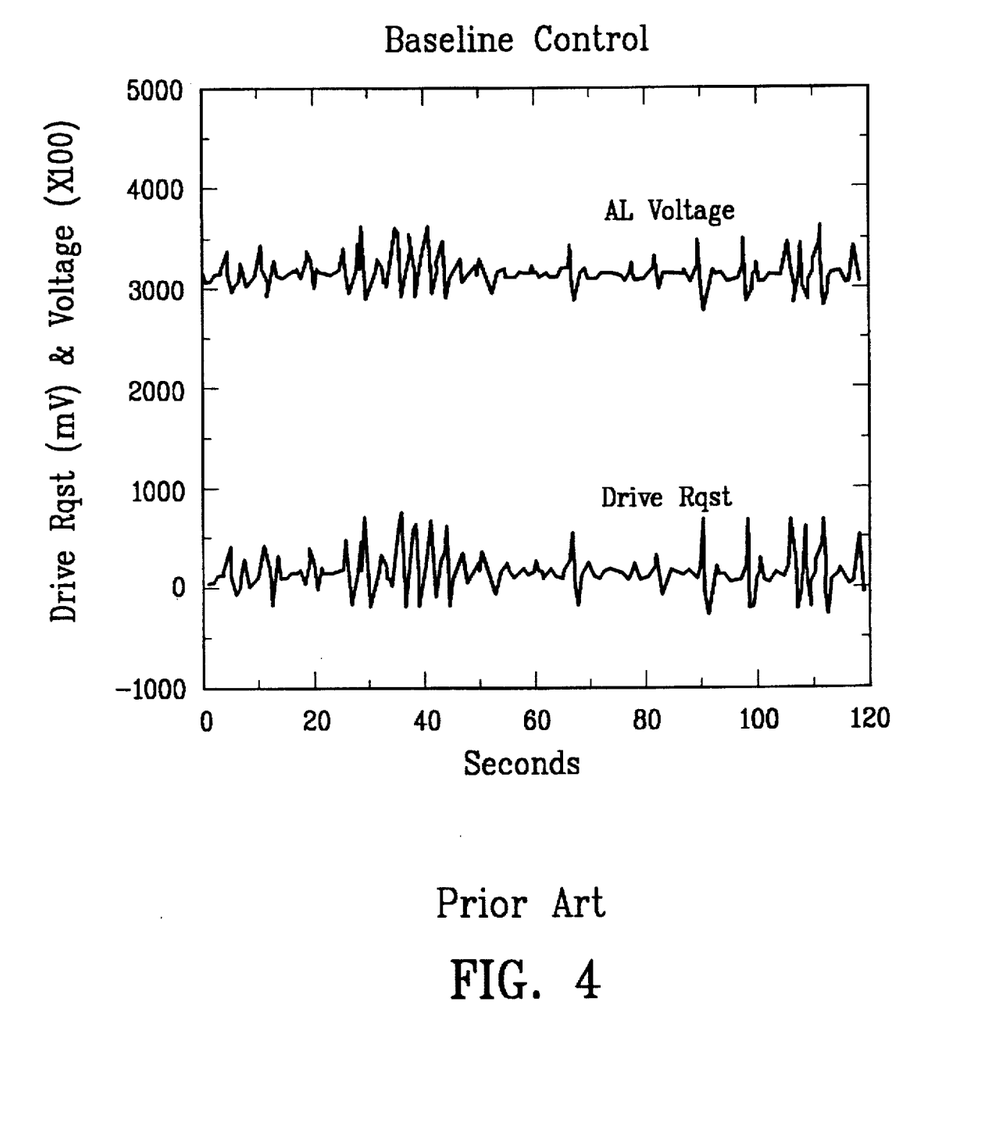
FIG. 4 is a typical graph of voltage (top) and electrode drive signals for an industrial ESR furnace controlled according to the method of FIG. 2.
Figure 5:
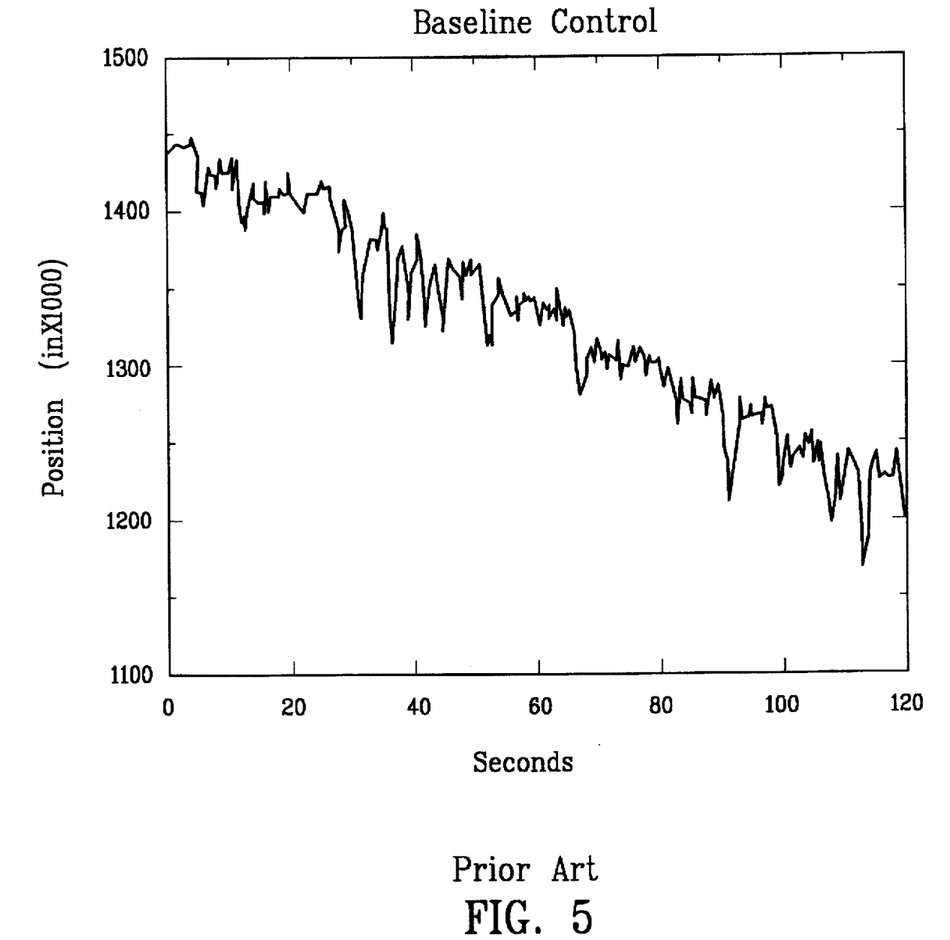
FIG. 5 is a typical graph of electrode position versus time for an industrial ESR furnace controlled according to the method of FIG. 2.

In existing ESR controllers, the V(rms) error is used to drive the electrode. $V_s$ is compared to a set point, and any error is used to modify the comparison between V(rms) and V(set point) by adding a positive or negative offset voltage to the V(rms) readings. If the $V_s$ is less than the set point, the overall immersion depth is assumed to be too great and a negative offset is added to V(rms), which causes the system to operate at a higher voltage level. The opposite occurs if the $V_s$) is greater than its set point. The net result is that, on short time scales, the electrode moves in response to a voltage error, and on a longer time scale, the voltage swing signal is used to maintain a generally shallow immersion depth. Although V(rms)+$V_s$ control systems are effective at maintaining the electrode near the slag surface, their operation results in uncontrolled and erratic electrode movement. A key point to note is that it is the electrode movement about a voltage set point that actually generates the swing signal used for control. Larger $V_s$ values may result from greater electrode motion, reduced immersion depth, or some combination of the two. FIG. 4 is a plot of the voltage and electrode drive signals for an industrial furnace, and FIG. 5 is the a plot of electrode position for the same time period. The erratic movement of the electrode limits the ultimate stability of the thermal environment and hence the ability to optimize solidification. The present invention is of a method and means by which an electrode can be maintained at a fixed immersion depth in the slag without the extensive and uncontrolled movement inherent in existing systems. This represents a significant advance toward accomplishing the goals of constant electrode-to-pool gap and maximum stability of the slag pool.

SUMMARY OF THE INVENTION
(DISCLOSURE OF THE INVENTION)

The present invention is of a method and apparatus for controlling an electroslag remelting furnace, comprising: immersing an electrode in slag within the furnace; driving the electrode down into the slag at an approximately constant drive rate; and imposing a periodic fluctuation on the drive rate. In the preferred embodiment, a periodic fluctuation is imposed on the drive rate to produce a discernable voltage swing signal, the voltage swing signal is compared to a predetermined value, and the drive rate is adjusted based on the result of the comparison. The periodic fluctuation preferably has a period short enough to prevent isopotential lines from moving with the electrode, is between approximately six to fifteen seconds, and has a sine wave, square wave, or sawtooth wave pattern. A dc offset signal is preferably employed, with the periodic fluctuation being imposed onto the dc offset signal.

A primary object of the present invention is to provide an ESR control system substantially eliminating random fluctuations in immersion depth, replacing same with a controllable periodic fluctuation.

A primary advantage of the present invention is that a more stable thermal environment is maintained, resulting in a more homogenous ingot.

Another advantage of the present invention is that it can function at shallower immersion depths.

Still another advantage of the present invention is that it improves the surface quality of the ingot and reduces the thickness of the slag skin by keeping the slag more quiescent and by operating at shallower immersion depths.

Other advantages of the present invention are that it reduces macro segregation and other melt-related defects, and provides more uniform composition and grain structure, and better surface quality of the ingot.

Other objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE DRAWINGS

The accompanying drawings, which are incorporated into and form a part of the specification, illustrate several embodiments of the present invention and, together with the description, serve to explain the principles of the invention. The drawings are only for the purpose of illustrating a preferred embodiment of the invention and are not to be construed as limiting the invention. In the drawings.

DESCRIPTION OF THE PREFERRED EMBODIMENTS (BEST MODES FOR CARRYING OUT THE INVENTION)

The present invention is of a process and apparatus for controlling an electroslag remelt (ESR) furnace. It represents a significantly different approach to furnace control, and results in advances in both process stability and quality of the ingot produced. The invention moves the electrode in a controlled, periodic manner to generate an electrical signal called "voltage swing" which is used to estimate the immersion depth of the electrode. Voltage swing results from relative motion between the electrode and the slag. In existing systems, the voltage swing signal is generated by the electrode's uncontrolled, random motions as the system tries to correct a voltage error. The uncontrolled motion limits both the stability of the process and the minimum immersion depth at which the electrode can be maintained, both of which limit the extent to which the process can be optimized.

In any solidification process, achieving a homogeneous structure requires that the thermal and fluid flow environments surrounding the solidification front be as stable as possible. In the ESR process, this requires that the bottom of the electrode be maintained in a fixed position with respect to the surrounding slag bath and the molten pool, and as near the slag bath surface as is possible. Existing ESR control systems are unable to achieve this because the electrode moves erratically in the slag in response to a voltage error. This invention solves this problem by forcing the electrode to move in a controlled, low amplitude, periodic cycle.

Figure 1:
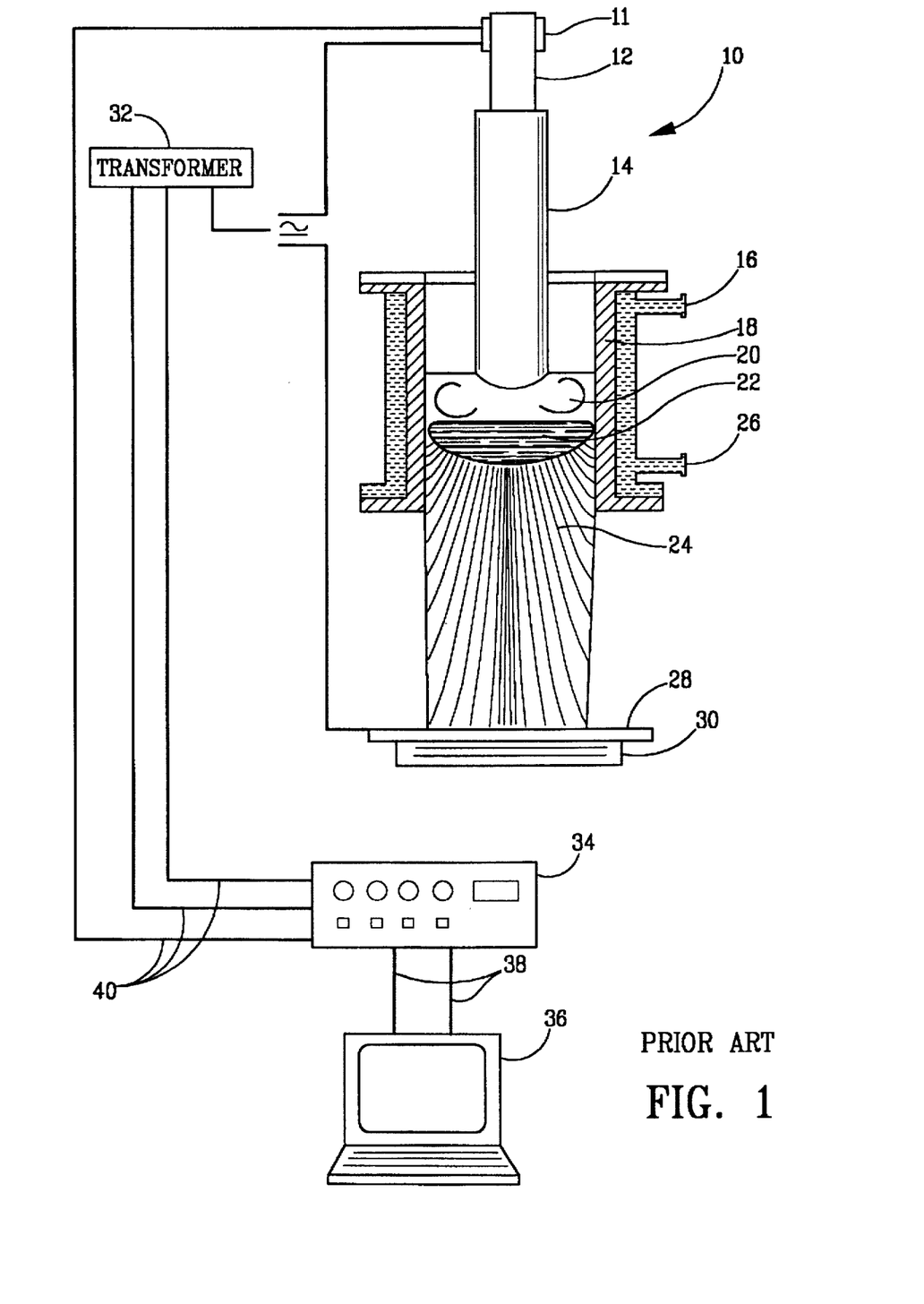
FIG. 1 is a schematic diagram of an electroslag remelting furnace according to the invention.

As shown in FIG. 1, ESR is a consumable electrode process in which the electrode is continuously fed into the top of a molten ionic slag bath 20. An electrical current is passed through the slag, resistively heating it and keeping it at a temperature above the liquidus of the electrode material, causing the electrode to melt. The molten droplets fall through the slag, collecting in the bottom of the crucible (not shown), building up an ingot 24.

Figure 6:
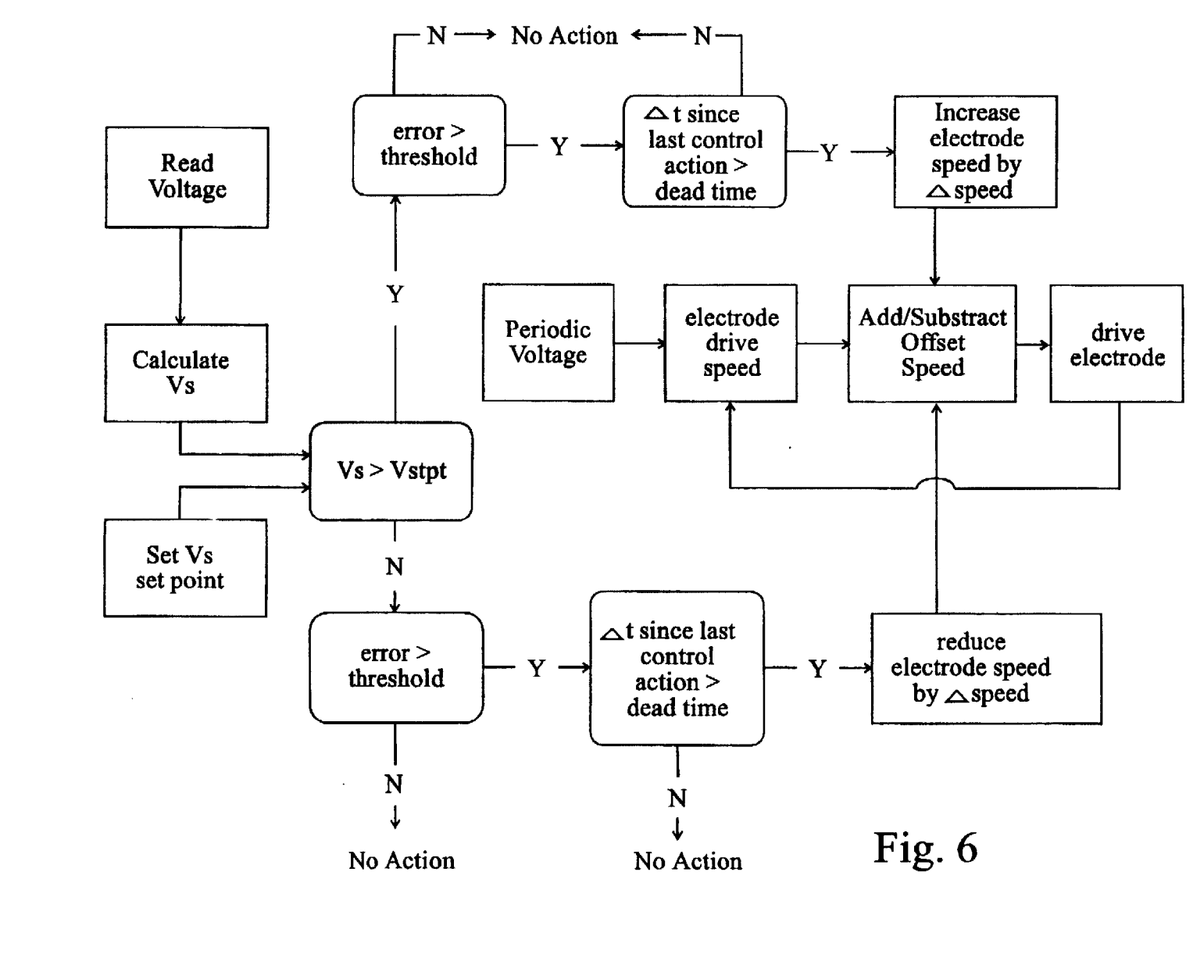
FIG. 6 is a flow diagram of the preferred method of the invention.
Figure 7:
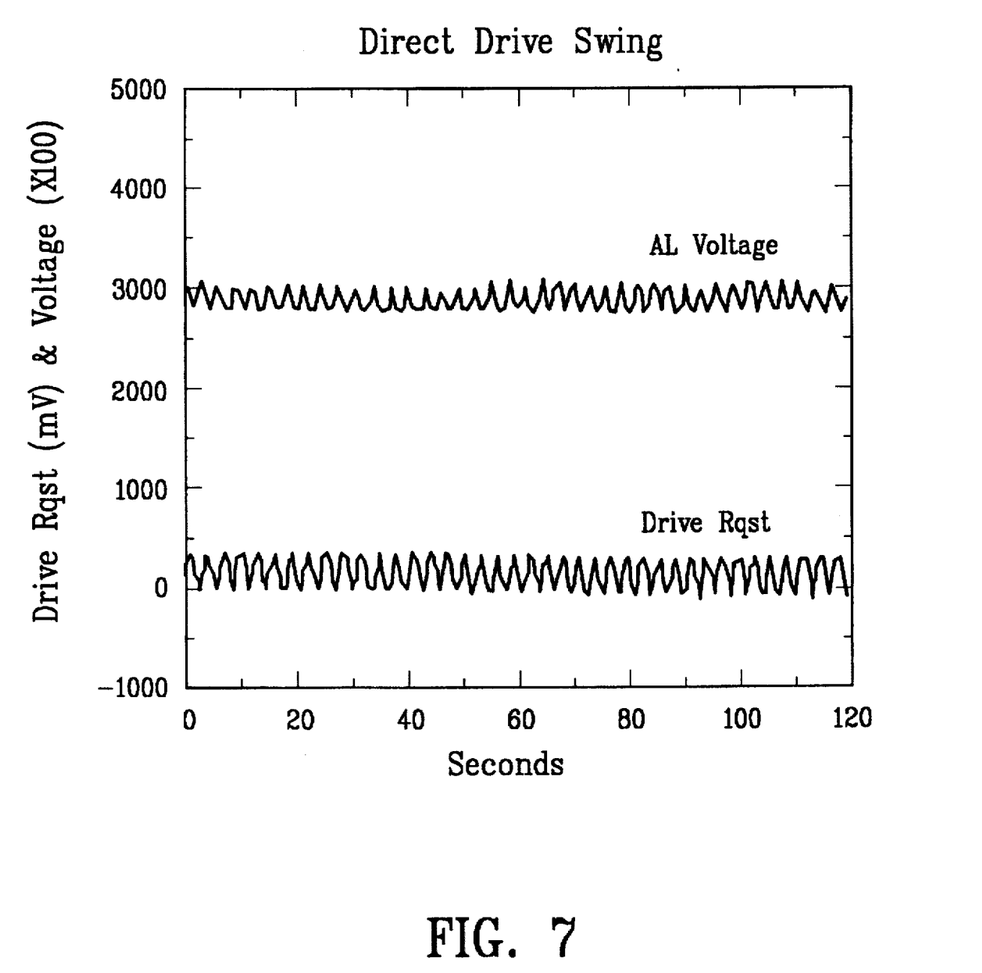
FIG. 7 is a graph of voltage (top) and drive speed versus time for an industrial furnace controlled according to the method of FIG. 6.
Figure 8:
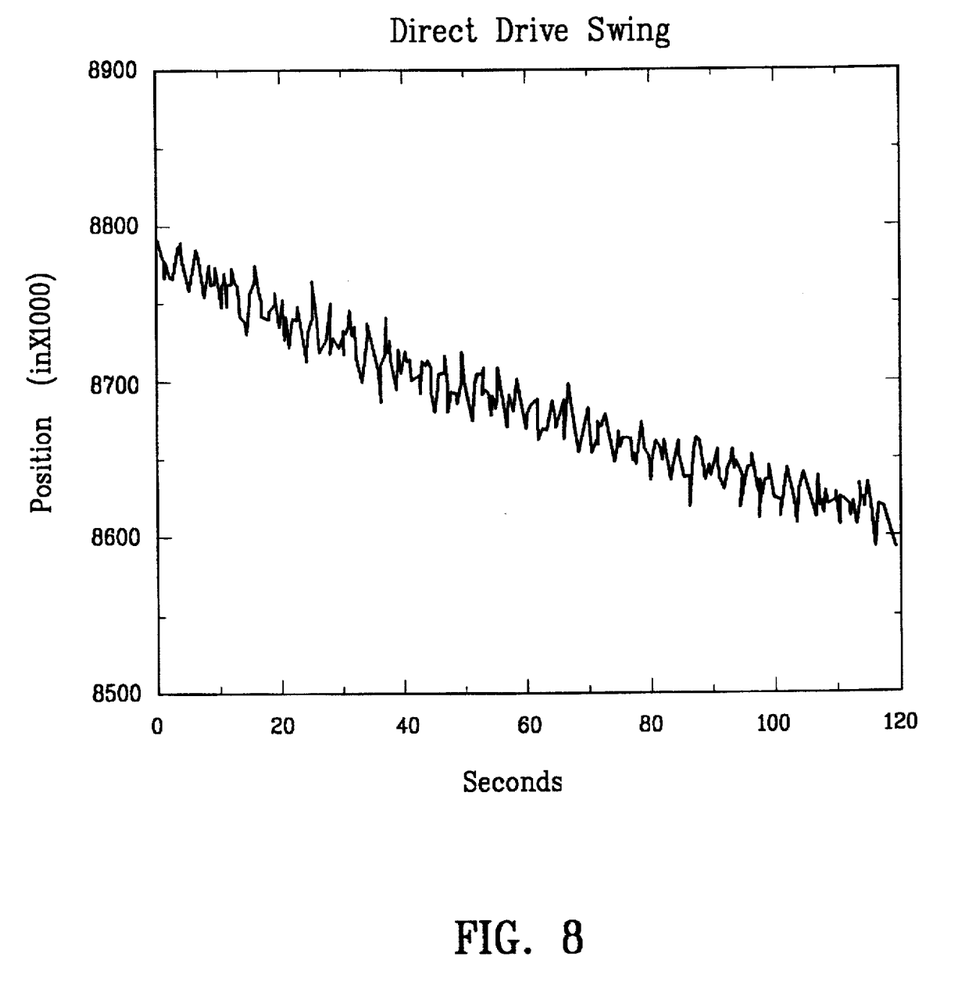
FIG. 8 is a graph of electrode position versus time for an industrial furnace controlled according to the method of FIG. 6.

The ESR process is used primarily to take advantage of the refining properties of the slag and to control the solidification structure of the ingot. However, the homogeneity of the ingot structure is limited by the ability of the control system to maintain a constant thermal environment surrounding the solidification process. One of the key factors required to accomplish this stability is maintaining a constant gap between the bottom of the electrode and the top of the molten pool. Existing diagnostic systems cannot measure this distance directly, so it is inferred from a combination of electrical signals and controlled slag additions. The assumption is made that the slag thickness remains constant, so the gap is maintained by controlling the immersion depth of the electrode in the slag. Voltage swing ($V_s$) has proven to be a robust measure of electrode immersion depth. Generation of this signal requires relative movement between the electrode and the isopotential lines in the slag. In existing systems, this relative movement results from the drive system searching for a V(rms) set point, or responding to a V(rms) fluctuation caused by an inherent process instability. In the present invention, this movement is accomplished by directly driving the electrode using an imposed periodic signal, for example a sine, square, or sawtooth wave. This periodic signal is superimposed onto a dc offset signal which corresponds with the unidirectional movement required to keep advancing the electrode as it melts. The amplitude and period of the signal are carefully selected to produce a fixed amount of electrode movement. Therefore, the $V_s$ signal arises from a known, constant electrode motion, so changes in $V_s$ are due only to changes in immersion depth. In the new system, $V_s$ is compared to a set point and the unidirectional offset speed adjusted accordingly. The size and time between changes in the unidirectional offset speed are controlled to smooth the changes in the relative position of the electrode in the slag and to allow time for the fluid and thermal fields in the slag to stabilize before another control action is taken. Once a set point is reached, the net electrode movement is essentially unidirectionally downward, with only minor periodic speed adjustments and a virtually undetectable ripple around the unidirectional drive. The overall control strategy is shown schematically in FIG. 6. FIGS. 7 and 8 show plots of V(rms) and electrode drive speed versus time, and electrode position versus time, respectively. A comparison with FIGS. 4 and 5 shows that the present invention affords far smoother operation than existing systems.

The amplitude and period of the drive signal can be selected for a particular mold/crucible configuration and general range of operating conditions. Values can be chosen which will generate a usable swing signal at a desired immersion depth with minimum electrode movement and maximum stability. For example, the following parameters may be used with a 17" diameter nickel-based alloy electrode, a 20" diameter ingot, and a hydraulic drive system:

| | |
|---|---|
| $V_s$ set point | 1.5 V |
| $V_s$ threshold | ±0.2 V |
| $V_s$ buffer size | 30 seconds |
| $V_s$ calculation method | standard deviation |
| period | 6 seconds, 3 seconds |
| amplitude | 1.5 in/min |
| speed step size | 0.01 in/min |
| dead time | 40 seconds |

Where:

| | |
|---|---|
| $V_s$ set point | is the voltage swing set point; |
| $V_s$ threshold | is the $V_s$ error below which the system will not make a correction; |
| $V_s$ buffer size | is the time over which V(rms) values are collected prior to taking the standard deviation of the set to get $V_s$; |
| $V_s$ calculation method | is either standard deviation or peak to peak; |
| period | is the period of the sine or square wave used as the drive signal; |
| amplitude | is the amplitude of the drive speed sine or square wave; |
| speed step size | is the change in the offset speed which is made if the $V_s$ error exceeds the threshold and the time since the last control action exceeds the dead time; and |
| dead time | is the minimum time allowed between control actions. |

$V_s$ set point, $V_s$ threshold, and speed step size values were chosen based on experimental data generated using similar systems. The amplitude and period of the oscillations, and the dead time between control actions were selected based on computational simulations of the system. Considering amplitude and period, the simulations suggested that this combination would result in electrode movement which, while much smaller than generated by a standard swing controller, would result in a sufficiently robust $V_s$ signal to permit control. The period of 6 seconds is preferred because the simulations showed that, in response to the prescribed electrode movement from top to bottom of a cycle (½ period), the fluid flow in the slag bath took greater than 4 seconds to stabilize. (In extremely large systems, the preferred period may be up to 15 seconds.) Therefore, the selection of a 6 second period ensures that the isopotential lines cannot "keep up" with the electrode movement, so a sufficiently large $V_s$ signal will be generated. The dead time between control responses should be sufficient for the entire slag thermal and fluid flow environment to approach stability, and for an entire new buffer of swing values to be stored.

FIGS. 4–5 and 7–8 show examples of the furnace voltage, drive speed, and electrode position signals generated using V(rms)+$V_s$ and sine wave drive control systems, respectively. In these trials, immersion depth could be reliably held maintained within 0.5" and 0.3" of the slag surface, respectively. These figures clearly illustrate the smaller and more regular movement of the electrode using the sine wave drive system of the invention.

FIG. 1 illustrates the preferred apparatus 10 of the present invention. The electroslag remelting furnace comprises electrode clamp 11, stinger 12, electrode 14, cooling water out 16, mold 18, slag pool 20, molten metal pool 22, ingot 24, cooling water in 26, starting plate 28, water cooling 30, and transformer 32. The furnace itself is conventional. The system further comprises control panel 34 and control computer 36, which are operably connected by data pathways 38. Control panel 34 is operably connected to the ESR furnace by electrical pathways 40 which permit issuance of commands to control positioning of electrode 14. Control panel 34 (optionally in conjunction with control computer 36, preferably also receives or computes, as is well known, data concerning rms voltage, voltage swing, electrode position, electrode weight, electrode drive speed, mold position (for furnaces with moving molds), mold drive speed (also for furnaces with moving molds), and water flow rates.

Control computer 36, preferably comprising a memory, processor, input device (e.g. keyboard and mouse), and display screen, has software or firmware implementing the preferred control algorithm discussed above. Control computer 36 may be implemented within control panel 34, rather than as a physically separate entity.

The direct drive control system of the invention may be incorporated into an existing control system, such as the Specialty Metals Processing Consortium (SMPC) ESR Controller Program. At present, this software runs in National Instruments' LabWindows environment, and requires an Intel 486—based personal computer plus two National Instruments Input/Output boards to run. However, the present invention is easily adaptable to different computer languages, architectures, and equipment.

The proposed system is technically different from existing systems in two fundamental ways. The first is that the $V_s$ signal is generated by a controlled electrode motion rather than by the electrode moving about randomly in response to a system voltage error. The second fundamental difference is that the new system attempts to maintain the desired electrode position by using the $V_s$ signal to modify a unidirectional drive speed. Existing systems attempt to maintain the desired electrode position by driving directly off a voltage error, with the algorithm used to calculate this voltage error incorporating the $V_s$ signal in some form. In other words, the new system is based on electrode drive speed, whereas existing systems are based on electrode position (as represented by V(rms)).

By maintaining a fixed immersion depth without the random motion associated with a correctly functioning swing controller, a more stable thermal environment is maintained and the ability to produce a homogeneous ingot is enhanced. Furthermore, the electrode drive of the invention allows a given system to be operated in a stable manner at far shallower immersion depths. In existing systems, the minimum immersion depth is limited by random electrode excursions which lead to electrode withdrawal and arcing, in turn contributing to contamination of the molten metal on the bottom of the electrode. The ability of the present invention to operate at shallower immersion depths opens up the possibility of achieving a given melt rate at a higher voltage/lower current combination than with existing systems. Operating in such a mode offers a further possibility of altering the geometry of the molten pool to achieve a more stable solidification front.

Material improvements resulting from greater process stability include a reduction of macrosegregation, reduction of melt-related defects, more uniform composition and grain structure, and better surface quality. All of these steps will lead to both higher performance materials and lower processing losses. The consistency will allow larger ingots to be produced and may eliminate the need for a final vacuum arc remelt (VAR) step to achieve the ultimate consistency. In addition to reducing cost, eliminating VAR will also improve material quality because VAR itself is prone to a series of melt-related defects which do not appear in ESR.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A method for controlling an electroslag remelting furnace having an electrode immersed in slag within the furnace, the method comprising the steps of:

driving the electrode into the slag at a constant drive rate;

periodically varying the drive rate to produce a periodic variation of voltage swing signal across the electrode; and comparing the voltage swing signal to a predetermined value to control the constant drive rate of the electrode.

2. The method of claim 1 wherein the driving step comprises applying a dc offset voltage to an electrode drive rate controller, and the varying step comprises (imposing) placing a periodic voltage (fluctuation) on the dc offset voltage (drive rate to produce a discernable voltage swing signal).

3. The method of claim 2 wherein the comparing step comprises changing the dc offset voltage if the magnitude of the voltage swing signal exceeds the predetermined value by a threshold amount.

4. The method of claim 1 wherein the periodic variation has a period longer than the time required for flow in the slag to stabilize after movement of the electrode.

5. The method of claim 4 wherein the periodic variation has a period within the range extending from six to fifteen seconds.

6. The method of claim 1 wherein the voltage swing signal is selected from the group consisting of sine waves, square waves, and sawtooth waves.

7. The method of claim 3 wherein the comparing step includes making no change in dc offset voltage for a predetermined dead time after each change in dc offset voltage.

* * * * *